TELEPHONE REPERTORY DIALER

Filed Dec. 28, 1964 3 Sheets-Sheet 1

INVENTORS J. L. FISCHER
L. A. STROMMEN
BY E J Olinder
ATTORNEY

May 28, 1968 J. L. FISCHER ET AL 3,385,934

TELEPHONE REPERTORY DIALER

Filed Dec. 28, 1964 3 Sheets-Sheet 2

May 28, 1968 J. L. FISCHER ETAL 3,385,934

TELEPHONE REPERTORY DIALER

Filed Dec. 28, 1964 3 Sheets-Sheet 3

3,385,934
TELEPHONE REPERTORY DIALER
James L. Fischer, Carmel, and Lawrence A. Strommen, Indianapolis, Ind., assignors to Bell Telephone Laboratories, Incorporated, New York, N.Y., a corporation of New York
Filed Dec. 28, 1964, Ser. No. 421,455
12 Claims. (Cl. 179—90)

ABSTRACT OF THE DISCLOSURE

In a repertory dialer telephone set conventionally generated multifrequency dial signals are translated into time coded signal envelope indicia for the purpose of storage. In the CALL mode, translation of the stored signal indicia is effected by a commutator arrangement in combination with a multifrequency oscillator.

This invention relates to telephone repertory dialers and more particularly to repertory dialers of the Touch-Tone multifrequency signaling type.

Repertory dialers are automatic telephone call transmitters which enable subscribers to initiate calls by exercising only a minimum of mechanical manipulation, for example, depressing a signal key, as opposed to dialing manually each digit of the called party's directory number. Basically, such apparatus comprises a register which initially stores signal indicia of a group of directory numbers and subsequently, when a call is to be placed, selectively applies these indicia, or related signal indicia, to a telephone line for transmission to a central office.

When dealing with conventional D-C signals such as those generated by the well known rotary type telephone dial, the pulses so generated are typically stored directly in the register or recording medium, which may be a magnetic drum or magnetic tape, for example. In the CALL mode of operation, means are known for extracting the recorded signals, amplifying these signals and applying them directly to a telephone line. One example of a repertory dialer of this type is disclosed in Patent 2,953,647, issued to A. E. Johanson, September 20, 1960.

With the advent of electronic central office switching systems which are adapted to receive multifrequency or Touch-Tone dial signals, a need has been created for a repertory dialer that stores and transmits multifrequency dial signals. In the prior art some attempts have been made to develop repertory dialers wherein the conventional pushbutton dial-generated, two-tone signals are recorded directly in the storage media. In such dialers these recorded tones are sensed on command and applied directly to the telephone line. One example of such an arrangement is disclosed in Patent 3,128,351 issued on Apr. 7, 1964, to L. A. Hohmann, Jr., F. W. Kinsman and T. P. Nenninger.

In a repertory dialer such as that disclosed by Hohmann et al., wherein dial-generated multifrequency signals are recorded and wherein these same signals are extracted and applied to the telephone line, consistent accuracy in extracting and transmitting the precise signals as dialed and recorded tends to fall below the rigorous reliability standard of telephone practice. Even though high precision components are utilized in combination with sophisticated frequency correcting arrangements and equipment for synchronizing recording speed with the read out speed, a certain amount of distortion still occurs, distortion that can result, under certain conditions, in the transmission of spurious signals. Additionally, even though the refinements indicated could conceivably reduce distortion to an acceptable level, the additional expense involved would unduly reduce the commercial attractiveness of the dialer.

One approach to solving the distortion problem inherent in the recording and subsequent reading out of multifrequency signals is disclosed by R. A. Miller and C. M. Trais in application Ser. No. 228,581, filed Oct. 5, 1962, now Patent No. 3,243,517. Miller and Taris employ a Touch-Tone or pushbutton dial and in one mode of operation conventional, dial-generated, two-tone signals may be applied directly to the telephone line without storage. When storage of a directory number is desired, however, the operation of the pushbutton dial results in the generation of a group of D-C signals which correspond, in terms of a binary type code, to the digit dialed. A four-track recording head is employed to apply the D-C signal or signals to a magnetic drum and it is the presence or absence of a signal on each of the four parallel tracks that preserves the identity of the dialed digit. On read out the four-track head simultaneously senses the presence or absence of the recorded D-C signal indicia on each successive group of four-track parallel recordings. This information is then converted into the conventional two-out-of-seven Touch-Tone code and is utilized to initiate the generation of conventional dual-tone, multifrequency signals for application to the telephone line.

Although the Miller-Taris approach avoids the distortion that is inherent in the direct recording and reading out of multifrequency signals, the multitrack concept introduces other disadvantages in terms of both cost and complexity. Consequently, there is no known system in the prior art that fully meets the need for a commercially attractive and operationally reliable multifrequency signaling repertory dialer.

Accordingly, one object of the invention is to improve repertory dialers of the multifrequency signaling type.

Another object is to reduce the complexity of repertory dialers of the type employing multifrequency signaling.

A further object is to reduce the cost of such dialers.

Another object is to enhance the reliability of such dialers.

These and other objects are achieved, in accordance with the principles of the invention, in a telephone repertory dialer that utilizes the operation of a substantially conventional pushbutton or Touch-Tone type dial to select a corresponding RC time constant from an RC gating circuit. The output of a single oscillator is applied to the gating circuit resulting in the generation of an oscillatory burst corresponding in duration, in accordance with a preselected code, to the digit indication of the operated pushbutton. In accordance with the invention, the oscillatory bursts of varying time durations are stored directly in the recording medium, which may be magnetic tape, for example.

In the CALL mode of operation, the principles of the invention call for extracting the oscillatory bursts from the tape and, by means of an amplifier and gating means, employing these oscillatory bursts to determine the rotation from a fixed home position of a printed circuit commutator. The location of the printed circuit commutator at the termination of the frequency burst period is utilized uniquely to select the proper switching on a conventional telephone multifrequency Touch-Tone oscillator. In effect, in accordance with the principles of the invention, the printed circuit commutator therefore fulfills essentially the same function as the switches associated with the buttons of a conventional pushbutton set in the course of the normal dialing function.

In accordance with a particular aspect of the invention the Touch-Tone dial may be used in the RECORD- ING mode to record in the fashion indicated, or to initiate directly the operation of a Touch-Tone oscillator, or to initiate simultaneously the recording sequences indicated and the operation of a Touch-Tone multifrequency oscillator and the application of the resulting multifrequency signals to a telephone line. Thus, a simultaneous RECORD and DIAL-OUT mode of operation is made available.

Accordingly, one feature of the invention pertains to an arrangement for the utilization of a Touch-Tone or multifrequency pushbutton type dial to initiate the generation, in a telephone repertory dialer, of single frequency tone bursts each corresponding in duration to the particular digit-pushbutton operated and subsequently the recording of such tone bursts directly on a recording medium.

Another feature of the invention relates to the combination in a telephone repertory dialer of a means responsive to a pushbutton or Touch-Tone dial for generating single tone oscillatory bursts each corresponding in duration to the digit dialed and a multifrequency oscillator responsive selectively, either independently or in combination with the recording means, to the operation of a pushbutton dial for generating conventional multifrequency tone pulses and for applying such pulses to a telephone line.

A further feature involves the combination, in a telephone repertory dialer, of a means responsive to the operation of a pushbutton dial for recording each selected digit in terms of a single frequency tone burst whose duration corresponds to the digit dialed in terms of a preselected code and to a means for extracting such recorded single frequency bursts from the recording medium and further to a means, which may include a printed circuit commutator for example, for translating such single frequency tone bursts of varied duration into mutifrequency tone bursts of a common duration.

These and other features and objects will be fully apprehended from the following detailed description of an illustrative embodiment of the invention and from the appended drawing, in which.

Figures 1A, 1B:
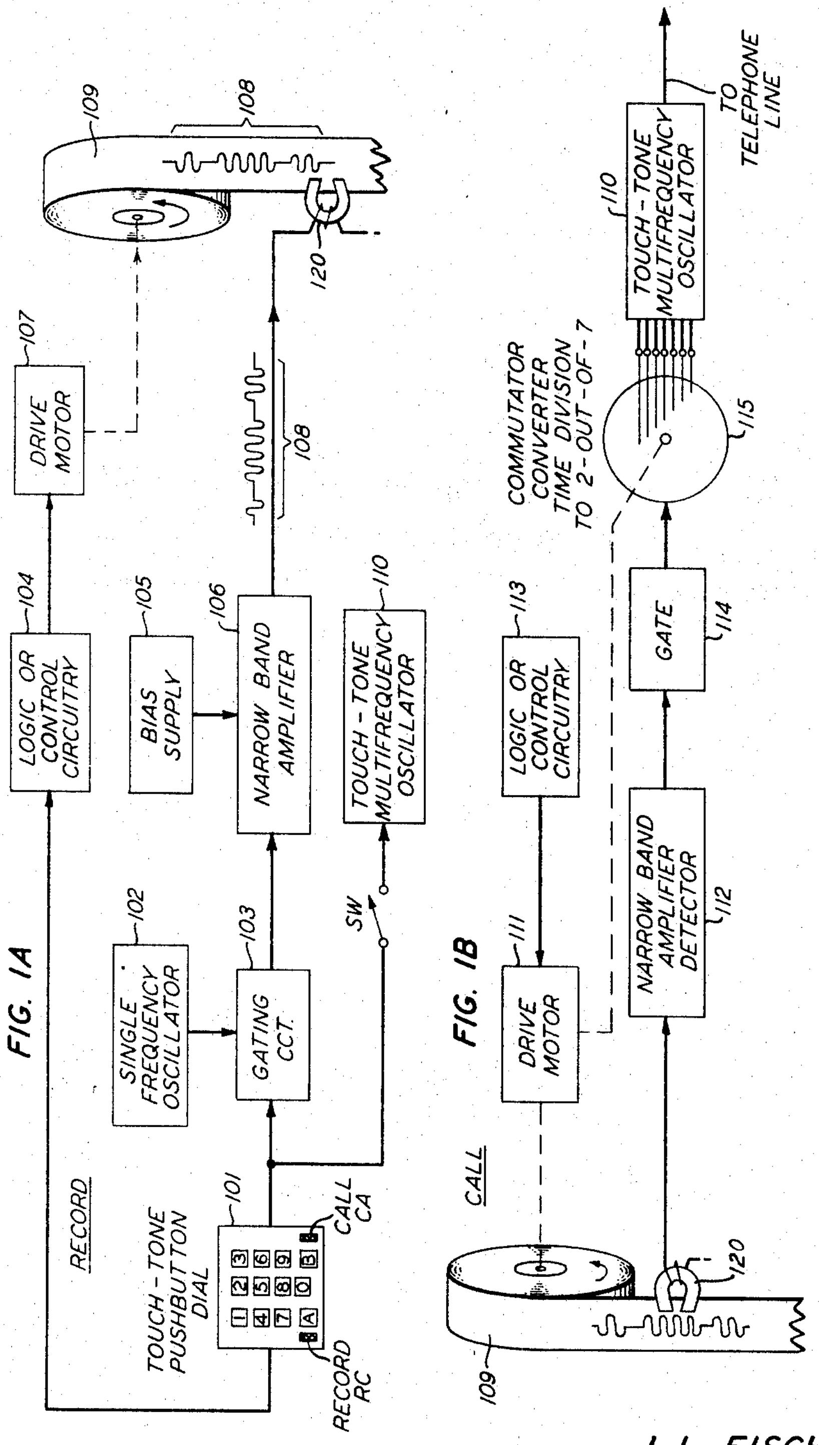
FIG. 1A is a block diagram of a telephone repertory dialer, in accordance with the invention, illustrating the RECORD mode of operation.
FIG. 1B is a block diagram of a telephone repertory dialer, in accordance with the invention, illustrating the CALL mode of operation.

The RECORD mode of operation of a telephone repertory dialer, in accordance with the invention, illustrated in block form by FIG. 1A, is initiated in conventional fashion by the operation of RECORD pushbutton RC of the Touch-Tone or pushbutton dial 101. RECORD button RC aligns certain portions of logic circuitry 104 and conditions the dialer in all respects for the RECORD mode. Details of the function and operation of a RECORD button are well known in the art being shown, for example, in Patent 3,128,351, cited above. The subsequent operation of any digit-representing pushbutton of the pushbutton dial 101 operates gating circuit 103 to permit an oscillatory burst from the single frequency oscillator 102 to be applied as an input to amplifier 106. The duration of each signal burst from oscillator 102 is indicative of a dialed digit in terms of a preselected code.

The output of amplifier 106, illustrated by signals 108, is applied to the tape head 120 and thus, as shown, signals 108 are recorded on magnetic tape 109. Signals 108, as shown, indicate the generation of three tone bursts, the first burst having a single unit duration, the second burst four units, and the third burst two units. These three signal bursts may correspond, therefore, to the dialing of digits 1, 4 and 2 in terms of a simple code.

Drive motor 107 advances tape 109 with respect to head 120 under the control of logic circuitry 104. In accordance with the invention, the recording of all of the oscillatory bursts representing the digits in a directory number are recorded sequentially and longitudinally along the tape. Further, each successive directory number is recorded in similar fashion in longitudinal alignment with the preceding number so that head 120 is kept in continuous alignment with the recorded signals. Accordingly when positioning tape 108 to locate a particular recorded directory number or to place head 120 in correspondence with the next successive recorded digit, no lateral relative movement between tape 108 and head 120 is required.

As a result of the elimination of one direction of relative motion between the tape and the head, i.e., lateral motion with respect to the tape, that is typically employed in conventional repertory dialers, accuracy of alignment and over-all reliability are considerably enhanced.

In accordance with the invention, a high degree of economy is effected in the utilization of tape in that no longitudinal drive of the tape is required to establish interdigital time inasmuch as interdigital time is established when the recorded information is reconstituted into conventional dual-tone multifrequency pulses. Moreover, with the employment of a less than conventional tape space for the recording of each directory number, relatively brief scan time and a reduction in over-all operating time is realized.

In accordance with the invention, direct dialing-out is provided for by Touch-Tone multifrequency oscillator 110 which may be placed under control of pushbutton dial 101 by the operation of switch SW. Thus, the principles of the invention afford a choice between direct dialing-out, recording, and a combination of direct dialing-out and recording.

The CALL mode of operation is initiated by the operation of CALL button CA. Signals extracted from tape 109 by head 120 are amplified and detected by amplifier-detector 112. By means of gate 114, the output of amplifier-detector 112 is suitably translated and applied to commutator-converter 115. It is communtator 115 that, in accordance with the invention, uniquely provides for the translation from the time division encoding, employed in recording, to a conventional Touch-Tone or two-out-of-seven dual tone multifrequency code that is utilized to control the operation of Touch-Tone multifrequency oscillator 110. The output from oscillator 110 is conventionally applied, as shown, to a telephone line in accordance with normal signaling practice.

Figures 2, 2A, 3A, 3B, 3C:
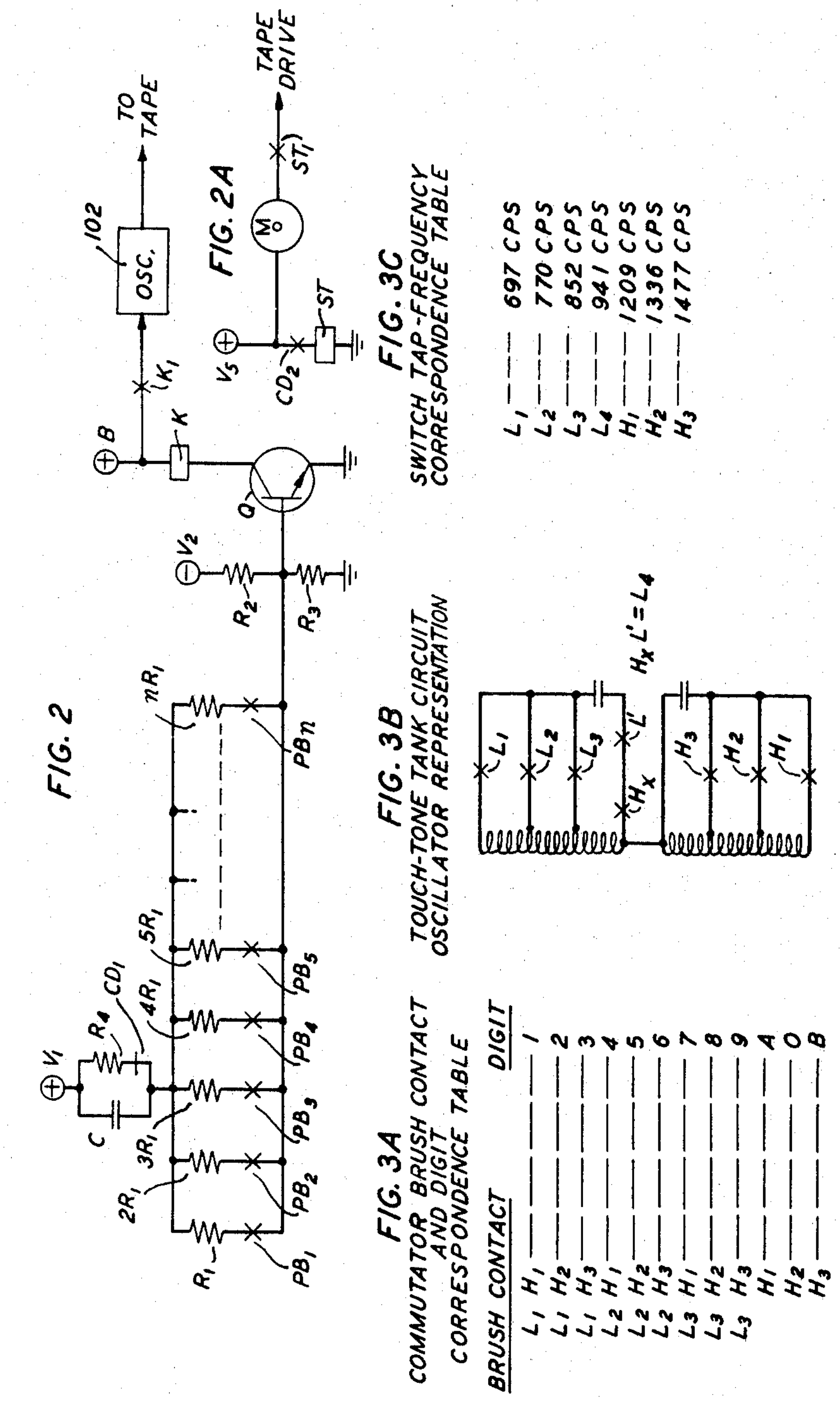
FIG. 2 is a schematic circuit diagram of the gating circuit shown in block form in FIG. 1A.
FIG. 2A is a schematic circuit diagram of a portion of the logic circuitry shown in block form in FIGS. 1A and 1B.
FIG. 3A is a table indicating the correspondence between brush contact combinations of the commutator of FIG. 1B and designated digits.
FIG. 3B is a schematic circuit diagram of a portion of the network of the oscillator tank circuits for the Touch-Tone oscillator shown in block form in FIGS. 1A and 1B.
FIG. 3C is a switch tap-frequency correspondence table for the circuit shown in FIG. 3B.

Details of the interrelation between dial 101, oscillator 102, and gating circuit 103 are shown in terms of the schematic circuit diagram of FIG. 2. A positive voltage supply $V_1$ is made available as a biasing source to the base of transistor Q by way of an RC circuit including a capacitor C and a resistor $R_4$ in series with a parallel array of resistors $R_1$ through $nR_1$, each of the resistors being in series with a respective one of the make contacts $PB_1$ through $PB_n$. The relative resistance magnitude of each of the resistors is indicated by its coefficient. Thus, for example, the resistance magnitude of resistors $3R_1$ and resistor $5R_1$ is 3 and 5 times, respectively, the resistance magnitude of resistor $R_1$. Each of the make contacts $PB_1$ through $PB_n$ is operated by a corresponding one of the digit pushbuttons on dial 101. The potential applied to the base of transistor Q is further controlled by voltage source $V_2$ and the voltage divider network comprising resistors $R_2$ and $R_3$. The application of the operating voltage B to oscillator 102 requires that sufficient current be passed by transistor Q to operate relay K, at which point the operation of make contact $K_1$ completes a path from voltage supply B to oscillator 102.

The operation of any digit pushbutton on dial 101 also operates break contact $CD_1$, which is common to all of the digit-representing pushbuttons. With the operation of a particular pushbutton, indicating the digit "3," for example, contact $PB_3$ is operated, completing a path for the application of turn-on biasing voltage to the base of transistor Q. The duration of this turn-on voltage is established by the discharge characteristics of the RC combination comprising capacitor C and resistors $3R_1$, $R_2$, and $R_3$. Release of the pushbutton closes CD, thus providing a discharge path for capacitor C through resistor R4. Irrespective of the particular time constant selected, the charge accumulated on capacitor C is removed during the 40 millisecond minimum interdigital time.

In accordance with the invention, the RC-determined intervals of oscillation established by relay K, and hence by oscillator 102, are independent of the duration of pushbutton depression. To eliminate the necessity of a timing circuit, the only requirement on the RC products is that $(5nR_1'C)$ is greater than the minimum possible digit depression during recording where $R_1'$ is the equivalent resistance made up of $R_1$, $R_2$, and $R_3$. The minimum depression is approximately 40 milliseconds. Consequently, for a twelve button dial, $3R_1'C \sim 40/12 = 3.33$ milliseconds and $R_1' \approx 1.1$ milliseconds. Normally-closed contact $CD_1$, which, as indicated above, is common to all digit buttons, operates sequentially ahead of the digit contacts $PB_1$ through $PB_n$.

Coincidentally with the operation described immediately above, a second common switch $CD_2$, FIG. 2A, is employed to operate stepping relay ST which is in series mechanically with the drive means for tape 109. Because of the relatively short "pulse" duration (i.e., the time associated with the signal bursts from oscillator 102), the RECORD speed is made considerably faster than the velocity of playback.

Certain details of the CALL mode of operation of a telephone repertory dialer in accordance with the invention are best described with reference to FIGS. 5A and 5B. Depressing CALL button CA closes contact $CA_1$, FIG. 5A, to complete an operating path for drive motor 111 which passes the desired portion of recorded tape 109 past playback head 120. Such control means are well known in the art, being shown, for example, in Patent 3,128,351 cited above. The combination amplifier-detector 112, shown in FIG. 5A, may advantageously be of conventional design employing, for example, a twin-T RC notch filter N in the negative feedback path 501. The design of this circuit may be such that the unit will oscillate at the detection frequency. Additional negative feedback may be provided to bring the amplifier-detector 112 below the threshold of oscillation by an amount corresponding to the detected level of the callback frequency. It is to be noted that the callback frequencies are not necessarily the same as the recorded frequencies because of possible differences in the relative speed between head 120 and tape 108 during RECORD and read-out or callback.

With additional negative feedback of the magnitude indicated, amplifier-detector 112 operates at a single frequency only and is independent of noise which may appear on the recording medium. As an alternative arrangement to that shown in block form in FIGS. 1A and 1B, in accordance with the invention, an amplifier-detector of the type described may serve a dual function in that appropriate tuning of notch filter N would allow the circuit to serve also as the single frequency oscillator source 102 of FIG. 1A during the recording function.

Figures 4, 5A, 5B:
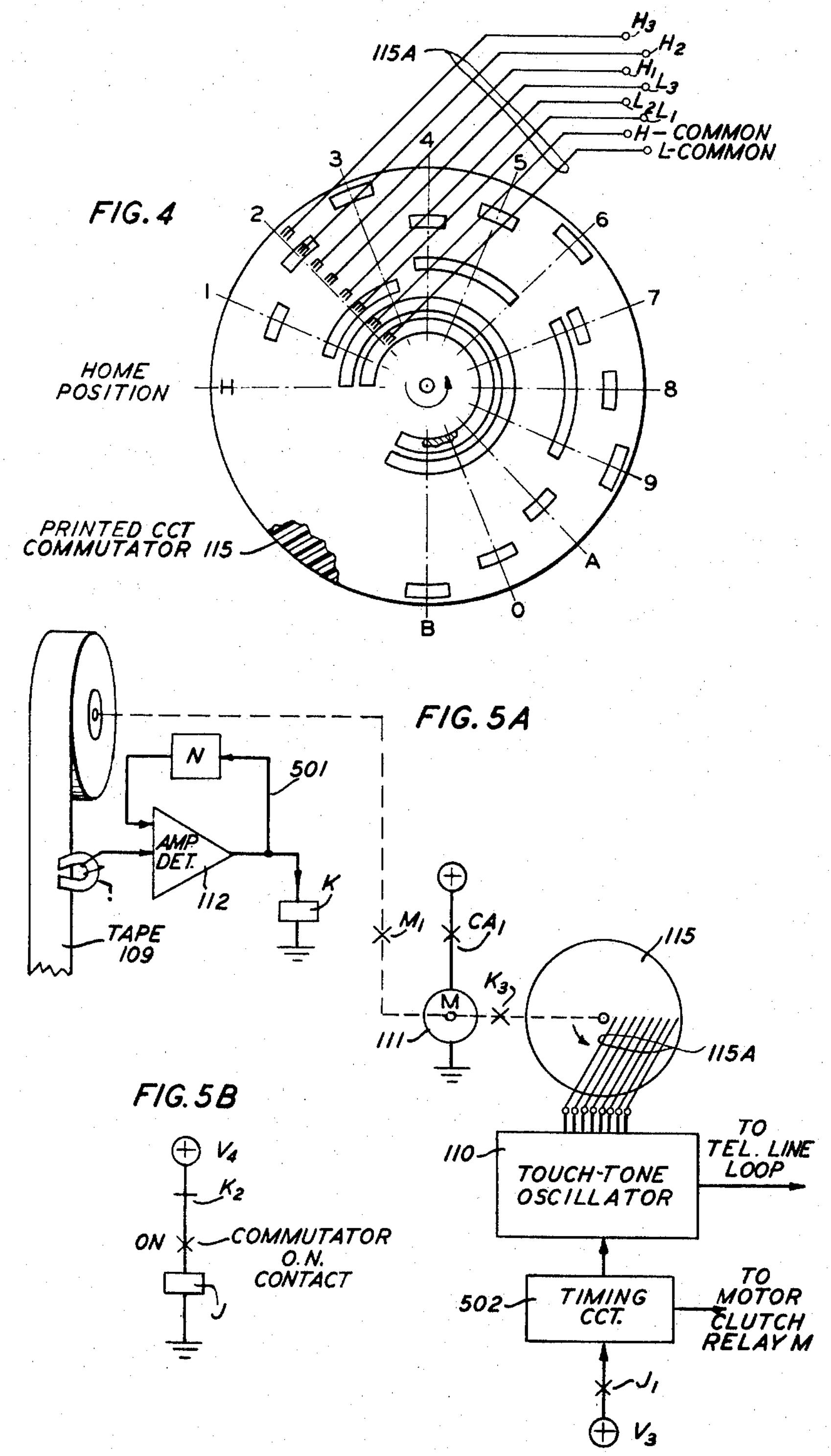
FIG. 4 is a detailed schematic diagram of the commutator shown in FIG. 1B.
FIGS. 5A and 5B are schematic circuit diagrams of selected key portions of the logic circuitry shown in block form in FIGS. 1A and 1B.

With the detection of a recorded signal by amplifier-deetctor 112, sufficient output is supplied to energize relay K, shown in FIG. 5A. The operation of relay K causes the motor 111 to rotate commutator 115 by way of make contacts $K_3$. Additionally, the opening of break contact $K_2$ opens the operate path of relay J, as shown in FIG. 5B.

The precise function of commutator 115 as a code converter may best be described with reference to FIG. 4. Stationary brushes 115A, individually designated H-common, L-common, L1, L2, L3, H1, H2, and H3, are positioned to detect the rotational position of commutator 115 in terms of their coincidence or lack of coincidence with the conductive arcuate areas imprinted on the surface of the commutator. As indicated above, commutator 115 is rotated to an angular position which is indicative of a particular time duration, which, in turn, is indicative of a particular dialed digit. At any particular angular position, either one or a unique combination of two brush contacts are closed, and each such closure or combination of closures corresponds to a particular digit, as shown in the table of FIG. 3A. Additional flexibility in signaling is provided for by the addition of character designations A and B, which may be employed in a twelve button set as special purpose signaling indicators.

The closure of any combination of the digit-representing brush contacts 115A is utilized to select a particular combination of frequencies from the oscillator tank circuits shown in FIG. 3B. The closure of each brush contact corresponds to a particular frequency, as in conventional dual tone or Touch-Tone multifrequency signaling, as shown in the table of FIG. 3C.

The subsequent absence of a detected signal de-energizes relay K. Commutator 115 stops when relay K releases. Relay J is energized by way of break contact $K_2$ and a commutator off-normal contact ON, shown in FIG. 5C. Contact $J_1$ of relay J, shown in FIG. 5A, applies operating voltage from source $V_3$ to Touch-Tone oscillator 110 by way of timing circuit 502 for some preselected period such as 50 milliseconds, for example. After timer 502 has removed operating voltage from oscillator 110, it provides some minimum interdigital WAIT time and then energizes a tape drive motor clutch relay.

During the period of interdigital WAIT, commutator drive motor 111 may be re-energized to drive the commutator disk to a home position H. Re-energization of tape drive motor 111 may be effected in a straightforward manner by a series of off-normal commutator contacts to ensure synchronism between recorded information and the commutator.

In the current transition period in the field of telephony between D-C signaling and multifrequency signaling, an increasing number of areas must provide facilities for handling both types of dialing signals. Accordingly, in many instances it may prove desirable to provide station equipment, such as repertory dialers, that are capable of selectively dialing out either D-C or multifrequency signals. One of the unique aspects of the instant invention is the ease with which a set of the type illustrated by the invention embodiment described herein may be converted to a set wherein the recorded signal may be utilized to initiate either multifrequency or D-C dial output signals. Means for translating recorded oscillatory signal bursts having durations corresponding to dialed digits in terms of a preselected code are known in the art, being disclosed, for example, by R. Kobler in Patent 3,104,287, issued Sept. 17, 1963. The simple combination of such means with an embodiment of the invention disclosed herein would provide a dialer with the capability of selectively dialing out either Touch-Tone or D-C signals.

It should be understood that the embodiment described herein is merely illustrative of the principles of the invention. Various modifications may be made thereto by persons skilled in the art without departing from the spirit and scope of the invention.

What is claimed is:

1. In a telephone repertory dialer, in combination, pushbutton dialing means, means for generating a single frequency oscillatory signal, means jointly responsive to said dialing and generating means for producing said oscillatory signal having a duration corresponding to a dialed digit in terms of a preselected code, means for recording the signal outputs of said last named means, means for extracting said outputs from said recording means, means for translating extracted ones of said outputs into common duration multifrequency signal bursts, and means for applying said bursts to a telephone line.

2. In a telephone repertory dialer, in combination, pushbutton dialing means, means responsive to the operation of a digit designated pushbutton of said dialing means for generating an oscillatory signal burst indicative of said digit in terms of duration in accordance with a first preselected code, means for storing said signal bursts, means for translating stored ones of said bursts into common duration multifrequency signals in accordance with a second preselected code, and means for applying said last named signals to a telephone line.

3. In a telephone repertory dialer, in combination, pushbutton dialing means, means responsive to the operation of a digit designated pushbutton of said dialing means for generating a single frequency oscillatory signal burst indicative of said digit in terms of duration in accordance with a first preselected code, means for storing said signal bursts, means for translating stored ones of said bursts into common duration dual frequency multifrequency signals in accordance with a second preselected code, and means for applying said last named signals to a telephone line.

4. Apparatus in accordance with claim 3 wherein said generating means comprises a gating circuit and an oscillator, said gating circuit being controlled by said dialing means for gating signals from said oscillator to said storing means for periods of time determined by the particular digit designating pushbutton operated.

5. Apparatus in accordance with claim 4 wherein said gating circuit includes a gate and a plurality of timing circuits each selectively responsive to the operation of a respective one of said pushbuttons for rendering said gate conductive for a unique period of time.

6. Apparatus in accordance with claim 5 wherein said timing circuits comprise R-C circuits and wherein said gate comprises a transistor.

7. In a telephone repertory dialer, in combination, pushbutton dialing means, means responsive to the operation of a digit designated pushbutton of said dialing means for generating a single frequency oscillatory signal burst indicative of said digit in terms of duration in accordance with a first preselected code, means for storing said signal bursts, means for translating stored ones of said bursts into common duration dual-frequency multifrequency signals in accordance with a second preselected code, means for applying said last named signals to a telephone line, means selectively responsive independently or simultaneously with said generating means to the operation of one of said pushbuttons for applying a corresponding signal in said second preselected code directly to a telephone line.

8. In a telephone repertory dialer, in combination, pushbutton dialing means, means responsive to the operation of a digit designated pushbutton of said dialing means for generating an oscillatory signal burst indicative of said digit, in terms of duration in accordance with a first preselected code, means for storing said signal bursts, means responsive to stored ones of said signal bursts for converting the duration of each of said last named bursts into signals expressed in a two-out-of-seven code, and means responsive to said last named signals for generating multifrequency signal bursts indicative of a corresponding stored one of said bursts in terms of said last named code.

9. In a telephone repertory dialer, in combination, pushbutton dialing means, means responsive to the operation of a digit designated pushbutton of said dialing means for generating an oscillatory signal burst indicative of said digit in terms of duration in accordance with a first preselected code, magnetic tape means, transducer means in cooperative relation with said tape means, means for effecting relative movement between said transducer and said tape, longitudinally with respect to said tape, means for applying said signal bursts to said transducer during said relative movement thereby to store said signal bursts longitudinally and sequentially along said tape, means for translating stored ones of said bursts into common duration multifrequency signals in accordance with a second preselected code and means for applying said last named signals to a telephone line.

10. Apparatus in accordance with claim 9 wherein said translating means comprises means for converting the duration of each of said stored signal bursts into a corresponding angular measure and means for converting said angular measure into a two-out-of-seven designation.

11. Apparatus in accordance with claim 9 wherein said translating means comprises commutator means.

12. In a telephone repertory dialer, in combination, pushbutton dialing means, means for generating a single frequency oscillatory signal, magnetic tape means, transducer means in cooperative relation with said tape means, means for effecting relative movement between said transducer means and said tape means, longitudinally only with respect to said tape, means including a gate and a plurality of R-C tuning circuits responsive to the operation of each of the digit designated pushbuttons of said dialing means for applying to said transducer an oscillatory signal burst from said generating means, said burst having a duration indicative of a respective one of said pushbuttons in terms of a first preselected code, whereby each successive one of said bursts is recorded longitudinally and successively along said tape, means including said transducer for extracting recorded ones of said bursts from said tape, and means including commutator means for converting the duration of each of said bursts extracted from said tape into a multifrequency signal burst of unvarying duration indicative of a respective one of said digit designating pushbuttons in terms of a second preselected code.

No references cited.

KATHLEEN H. CLAFFY, *Primary Examiner.*

A. H. GESS, *Assistant Examiner.*